(12) United States Patent
Kim et al.

(10) Patent No.: US 8,379,510 B2
(45) Date of Patent: Feb. 19, 2013

(54) DECODING APPARATUS AND METHOD IN A BROADBAND WIRELESS ACCESS COMMUNICATION SYSTEM

(75) Inventors: Sang-Hyo Kim, Seoul (KR); Weon-Heum Park, Hwaseong-si (KR); Jong-Han Lim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 987 days.

(21) Appl. No.: 11/984,367

(22) Filed: Nov. 16, 2007

(65) Prior Publication Data

US 2008/0117996 A1    May 22, 2008

(30) Foreign Application Priority Data

Nov. 16, 2006 (KR) .................. 10-2006-0113107

(51) Int. Cl.
*G01R 31/08* (2006.01)
(52) U.S. Cl. ........................................... 370/216
(58) Field of Classification Search .................. 370/216
See application file for complete search history.

(56) References Cited

U.S. PATENT DOCUMENTS

| | | | | |
|---|---|---|---|---|
| 5,229,863 A * | 7/1993 | Kao et al. | ............... | 358/426.03 |
| 6,567,397 B1 * | 5/2003 | Campana et al. | ............... | 370/349 |
| 6,625,223 B1 * | 9/2003 | Wimmer et al. | ............... | 375/259 |
| 7,305,605 B2 * | 12/2007 | Shirogane et al. | ............... | 714/751 |
| 2005/0246617 A1 * | 11/2005 | Kyung et al. | ............... | 714/801 |
| 2006/0187877 A1 * | 8/2006 | Lundby et al. | ............... | 370/328 |
| 2006/0190642 A1 * | 8/2006 | Aldereguia et al. | ............... | 710/60 |
| 2007/0101233 A1 * | 5/2007 | Eroz et al. | ............... | 714/758 |
| 2008/0253472 A1 * | 10/2008 | Griep | ............... | 375/295 |
| 2009/0022086 A1 * | 1/2009 | Dankberg et al. | ............... | 370/316 |

FOREIGN PATENT DOCUMENTS

| KR | 1020060055216 | 5/2006 |
|---|---|---|
| KR | 1020060097508 | 9/2006 |

\* cited by examiner

*Primary Examiner* — Derrick Ferris
*Assistant Examiner* — Saad A Waqas
(74) *Attorney, Agent, or Firm* — Roylance, Abrams, Berdo & Goodman, L.L.P.

(57) ABSTRACT

A decoding apparatus and method in a BWA communication system are provided, in which an ID-based decoder controller detects an ID from a data block by partially decoding the data block, and if the ID indicates that the data block is not for the receiver, outputs a control signal commanding non-decoding for the data block, a bitmap table controller indicates the data block as a non-decoding data block in a bitmap table according to the control signal, and a decoder distinguishes data blocks to be decoded from non-decoding data blocks based on the bitmap table, decodes the data blocks to be decoded and outputs the decoded data blocks, and simply outputs the non-decoding data blocks without decoding.

10 Claims, 16 Drawing Sheets

DECODING APPARATUS AND METHOD IN A BROADBAND WIRELESS ACCESS COMMUNICATION SYSTEM

CROSS-REFERENCE TO RELATED PATENT APPLICATION

This application claims the benefit under 35 U.S.C. §119 (a) of a Korean Patent Application filed in the Korean Intellectual Property Office on Nov. 16, 2006 and assigned Serial No. 2006-0113107, the entire disclosure of which is hereby incorporated by reference.

BACKGROUND OF THE INVENTION

1. Field of the Invention

The present invention relates to control of a downlink channel decoder in an Institute of Electrical and Electronics Engineers (IEEE) 802.16e Broadband Wireless Access (BWA) communication system. More particularly, the present invention relates to an apparatus and method for avoiding decoding of unnecessary Forward Error Correction (FEC) blocks using Connection Identifier (CID) information in a Medium Access Control (MAC) header.

2. Description of the Related Art

An active study area for 4th Generation (4G) communication systems is the provisioning of services with diverse Quality of Service (QoS) requirements at or above 100 Mbps to users. Particularly, active research is being conducted on providing high-speed service by ensuring mobility and QoS to a BWA communication system such as Wireless Local Area Network (WLAN) and Wireless Metropolitan Area Network (WMAN). Such major examples are IEEE 802.16d and IEEE 802.16e. Worldwide Interoperability for Microwave Access (WiMAX) and Wireless Broadband (WiBro) adopts the IEEE 802.16d and 802.16e technologies.

The IEEE 802.16d and IEEE 802.16e communication systems adopt Orthogonal Frequency Division Multiplexing/Orthogonal Frequency Division Multiple Access (OFDM/OFDMA) for physical channels in order to support a broadband transmission network. IEEE 802.16d considers only a single-cell structure with no regard to mobility of Subscriber Stations (SSs). In contrast, IEEE 802.16e supports the SS's mobility to the IEEE 802.16d communication system.

FIG. 1 illustrates a frame structure in the IEEE 802.16e communication system.

Referring to FIG. 1, a frame is a basic unit for data transmission in the IEEE 802.16e communication system. The frame is 5 ms in duration and includes 42 OFDM symbols.

The IEEE 802.16e frame is divided into a DownLink (DL) subframe and an UpLink (UL) subframe. The frame is comprised of a preamble, a Frame Control Header (FCH), a DL-MAP, DL bursts, a UL control channel, and UL bursts. A burst is a basic data transmission unit. The frame has a plurality of slots each slot being a basic unit for frequency resource allocation. One slot has 48 subcarriers. An arbitrary number of slots can be allocated to one burst.

In the IEEE 802.16e communication system, radio resources are allocated in slots. As stated above, a signal or data transmission unit using radio resources is referred to as a burst, for which a Modulation and Coding Scheme (MCS) is defined by a Downlink Interval Usage Code (DIUC) in the DL-MAP. The channel coding can be tail-biting convolutional coding or Convolutional Turbo Coding (CTC). Generally, the CTC is adopted for encoding data bursts, due to its excellent error correction performance.

When the CTC is used in the DIUC-based burst definition scheme, a maximum FEC unit for a CTC (i.e. the number of information bits included in a CTC codeword) has 480 bits. A FEC block size is determined for each MCS. If a burst size is larger than the maximum FEC block size, an information sequence is subject to fragmentation, encoding, and concatenation according to the standard.

FIG. 2 illustrates burst fragmentation and concatenation in the IEEE 802.16e communication system.

Referring to FIG. 2, a maximum FEC block size is expressed as the number of slots. Given a burst with N slots, if the burst is divided by up to j slots and N has a remainder when divided by j, the last two FEC blocks are of a smaller size than j. j is determined by an MCS according to the standard. Table 1 below lists values of j for CTCs.

TABLE 1

| MCS | j | Bytes per slot |
|---|---|---|
| QPSK, ½ | 10 | 6 |
| QPSK, ¾ | 6 | 9 |
| 16QAM, ½ | 5 | 12 |
| 16QAM, ¾ | 3 | 18 |
| 64QAM, ½ | 3 | 18 |
| 64QAM, ⅔ | 2 | 24 |
| 64QAM, ¾ | 2 | 27 |
| 64QAM, ⅚ | 2 | 30 |

The information sequence of a data burst takes the form of MAC Protocol Data Units (PDUs). A MAC PDU is for processing MAC-layer data. Its payload results from fragmentation or concatenation of MAC Service Data Units (SDUs).

FIG. 3 illustrates the structure of a MAC PDU in the IEEE 802.16e communication system.

Referring to FIG. 3, a Generic MAC Header (GMH) 310 is followed by payload 320 and a Cyclic Redundancy Check (CRC) 330. The GMH 310 and the CRC 330 are used for distinguishing and processing data on a MAC PDU basis in the MAC layer.

FIG. 4 illustrates the structure of the GMH in the IEEE 802.16e communication system.

Referring to FIG. 4, Header Type (HT) indicates the type of a header. That is, the HT indicates whether this header is a GMH or any other header. Encryption Control (EC) indicates whether payload is encrypted or not. CRC Indicator (CI) indicates whether the payload is followed by a CRC. Encryption Key Sequence (EKS) provides an encryption key. CID defines the connection that this PDU is servicing. Header Check Sequence (HCS) represents a CRC for the GMH. In the IEEE 802.16e communication system, there are two types of CIDs, basic CID and transport CID. The basic CID is specific to each Mobile Station (MS) and the transport CID is a CID related to MAC-layer data, identifying a connected service.

In the IEEE 802.16e communication system, information about data bursts is found in the DL-MAP. The DL-MAP provides information about a frame structure and information about all bursts included in a frame. Especially, information about the data bursts are provided by information providing units called Information Elements (IEs). A burst IE provides a basic CID specific to a particular MS so that the MS only can decode a burst corresponding to the burst IE. If the DL-MAP does not provide CIDs associated with the data bursts to reduce its overhead, every MS should decode the data bursts in the physical layer.

FIG. 5 illustrates the structure of a data burst in the IEEE 802.16e communication system.

Referring to FIG. 5, data with one or more PDUs is fragmented into FEC blocks in the physical layer according to a fragmentation and concatenation rule in a PDU domain 530. These FEC blocks are called FEC information blocks 520.

The FEC information blocks 520 are encoded to codewords. These codewords are called FEC codeword blocks 510. The FEC codeword blocks 510 are concatenated, thus producing a coded burst. The coded burst is Quadrature Amplitude Modulation (QAM)-modulated and allocated to frequency resources according to an allocation rule.

FIG. 6 is a block diagram of a decoder controlling apparatus in a receiver in the IEEE 802.16e communication system.

Referring to FIG. 6, the decoder controlling apparatus includes a soft metric buffer 610, at least one CTC decoder 624, at least one decoder input buffer 622, at least one decoder output buffer 626, a burst memory 630, and a controller 620.

The soft metric buffer 610 has FEC soft metric blocks. The size of an FEC soft metric block is equal to a maximum codeword size defined by the standard. The FEC soft metric block size is 960 in the IEEE 802.16e communication system. If one soft metric is represented in Z bits, the FEC soft metric block has 960Z bits.

FEC blocks that form a burst can be allocated to the FEC soft metric blocks. If one or more FEC soft metric blocks are completely stored in the soft metric buffer 610, decoding starts.

The FEC soft metric blocks are moved to the decoder input buffers 622. When the FEC soft metric blocks are completely stored in the decoder input buffers 622, the CTC decoders 624 CTC-decode the stored FEC soft metric blocks and then store them in the decoder output buffers 626. The decoded data are FEC information blocks. The FEC information blocks are rearranged at predetermined positions of the burst memory 630 on a burst basis. In general, the FEC information blocks that form one burst are controlled to be sequentially stored. The decoder controller 620 controls the FEC information blocks stored in the decoder output buffers 626 to be transferred to appropriate positions in the burst memory 630. When one burst is completely stored in the burst memory 630, the burst is provided to a MAC processor of the receiver.

As described above, MAC PDUs from various services can be transmitted in one burst in the IEEE 802.16e communication system. Especially when a DL-MAP IE does not have CID information about a burst, every MS should decode the burst.

For example, if during communications between an MS and a BS, a 20-Mbps burst is allocated without CID information and then a 3-Mbps burst is allocated to the MS, the MS should decode the bursts of 23 Mbps even though the 20-Mbps burst has no data for the MS, because there is no way to distinguish them. As a result, power consumption is increased in the MS.

Moreover, if the decoding capacity of the MS is 10 Mbps, the MS may not decode the 3-Mbps burst due to the preceding 20-Mbps burst.

Accordingly, there is a need for an improved decoding apparatus and method that decodes only necessary FEC blocks, thus saving power consumption.

SUMMARY OF THE INVENTION

Exemplary embodiments of the present invention address at least the above problems and/or disadvantages and provide at least the advantages described below. Accordingly, an aspect of exemplary embodiments of the present invention is to provide a decoding apparatus and method in a BWA communication system.

Another aspect of exemplary embodiments of the present invention provides an apparatus and method for avoiding decoding of unnecessary FEC blocks by checking the structure of a MAC PDU during decoding in a BWA communication system.

A further aspect of exemplary embodiments of the present invention provides an apparatus and method for decoding only necessary FEC blocks by checking the structure of a MAC PDU during decoding in a BWA communication system.

Still another aspect of exemplary embodiments of the present invention provides an apparatus and method for reducing power consumption by decoding only necessary FEC blocks in a BWA communication system.

In accordance with an aspect of exemplary embodiments of the present invention, there is provided a receiver in a BWA communication system, in which an ID-based decoder controller detects an ID from a data block by partially decoding the data block, and if the ID indicates that the data block is not for the receiver, outputs a control signal commanding non-decoding for the data block, a bitmap table controller indicates the data block as a non-decoding data block in a bitmap table according to the control signal, and a decoder distinguishes data blocks to be decoded from non-decoding data blocks based on the bitmap table, decodes the data blocks to be decoded and outputs the decoded data blocks, and simply outputs the non-decoding data blocks without decoding.

In accordance with another aspect of exemplary embodiments of the present invention, there is provided a reception method in a BWA communication system, in which a data block is partially decoded, an ID is detected from the partially decoded data block, a control signal commanding non-decoding for the data block is output, if the ID indicates that the data block is not for the receiver, the data block is indicated as a non-decoding data block in a bitmap table according to the control signal, data blocks to be decoded are distinguished from non-decoding data blocks based on the bitmap table, the data blocks to be decoded are decoded and output, and the non-decoding data blocks are simply output without decoding.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a decoding apparatus and method in a BWA communication system. The following description is made in the context of a CTC with the appreciation that the same method applies to other general convolutional codes.

Figure 1:
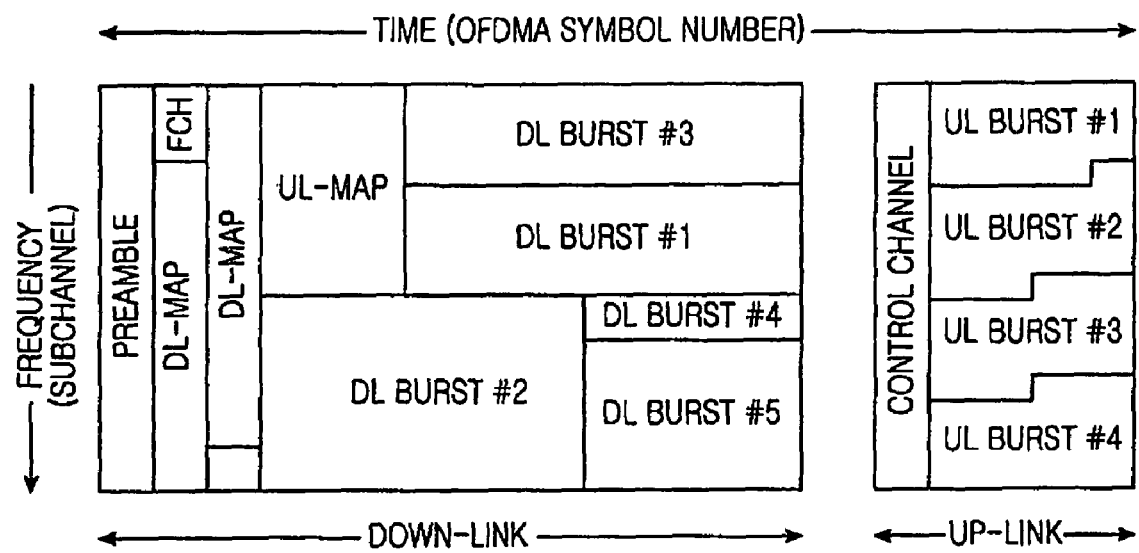
FIG. 1 illustrates a frame structure in an IEEE 802.16e communication system.
Figure 2:
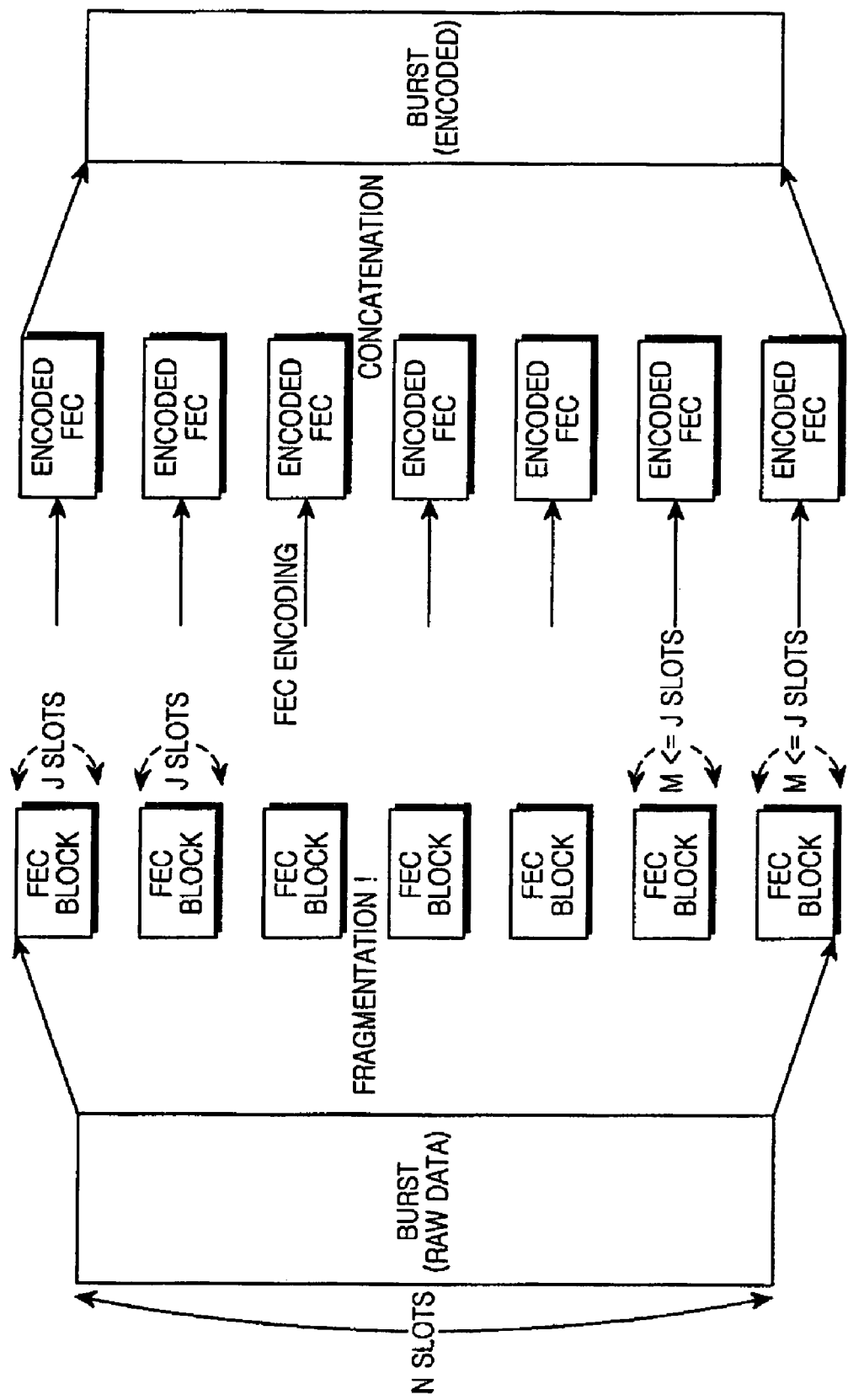
FIG. 2 illustrates burst fragmentation and concatenation in the IEEE 802.16e communication system.
Figure 3:
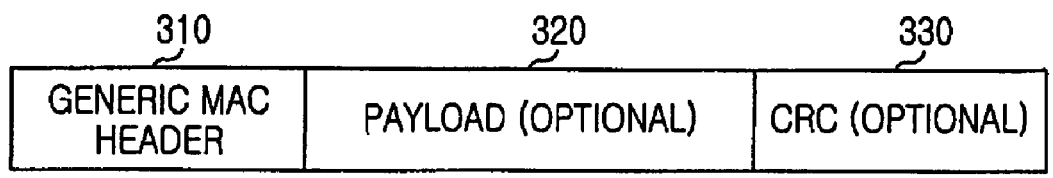
FIG. 3 illustrates the structure of a MAC PDU in the IEEE 802.16e communication system.
Figure 4:
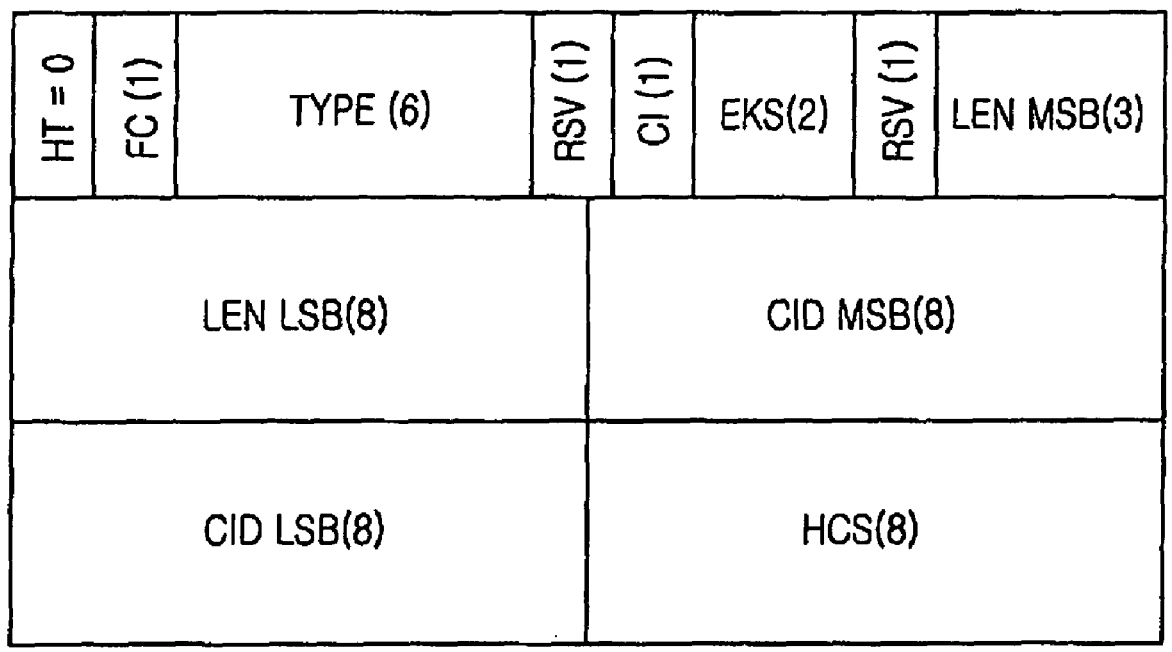
FIG. 4 illustrates the structure of the GMH in the IEEE 802.16e communication system.
Figure 5:
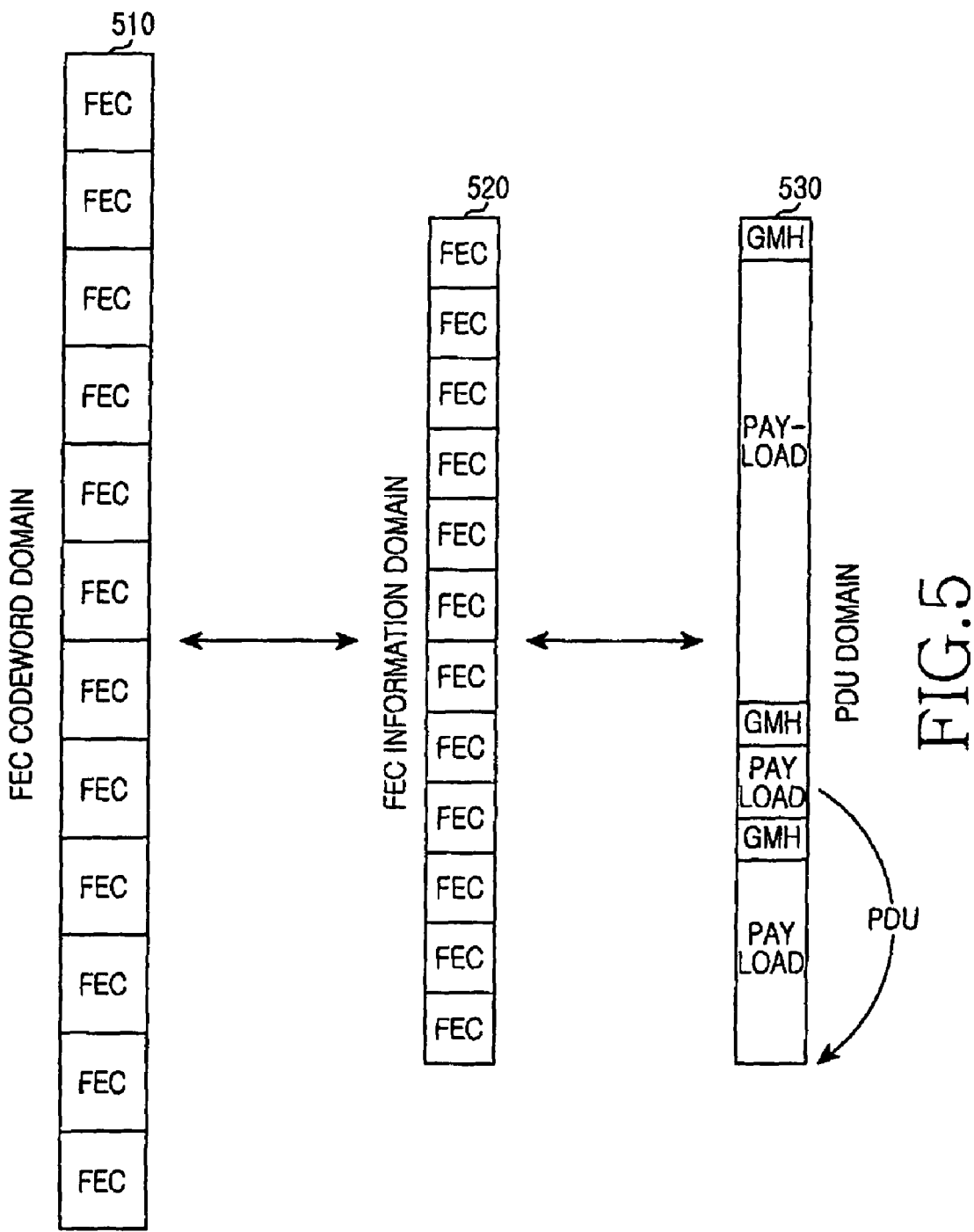
FIG. 5 illustrates the structure of a data burst in the IEEE 802.16e communication system.
Figure 6:
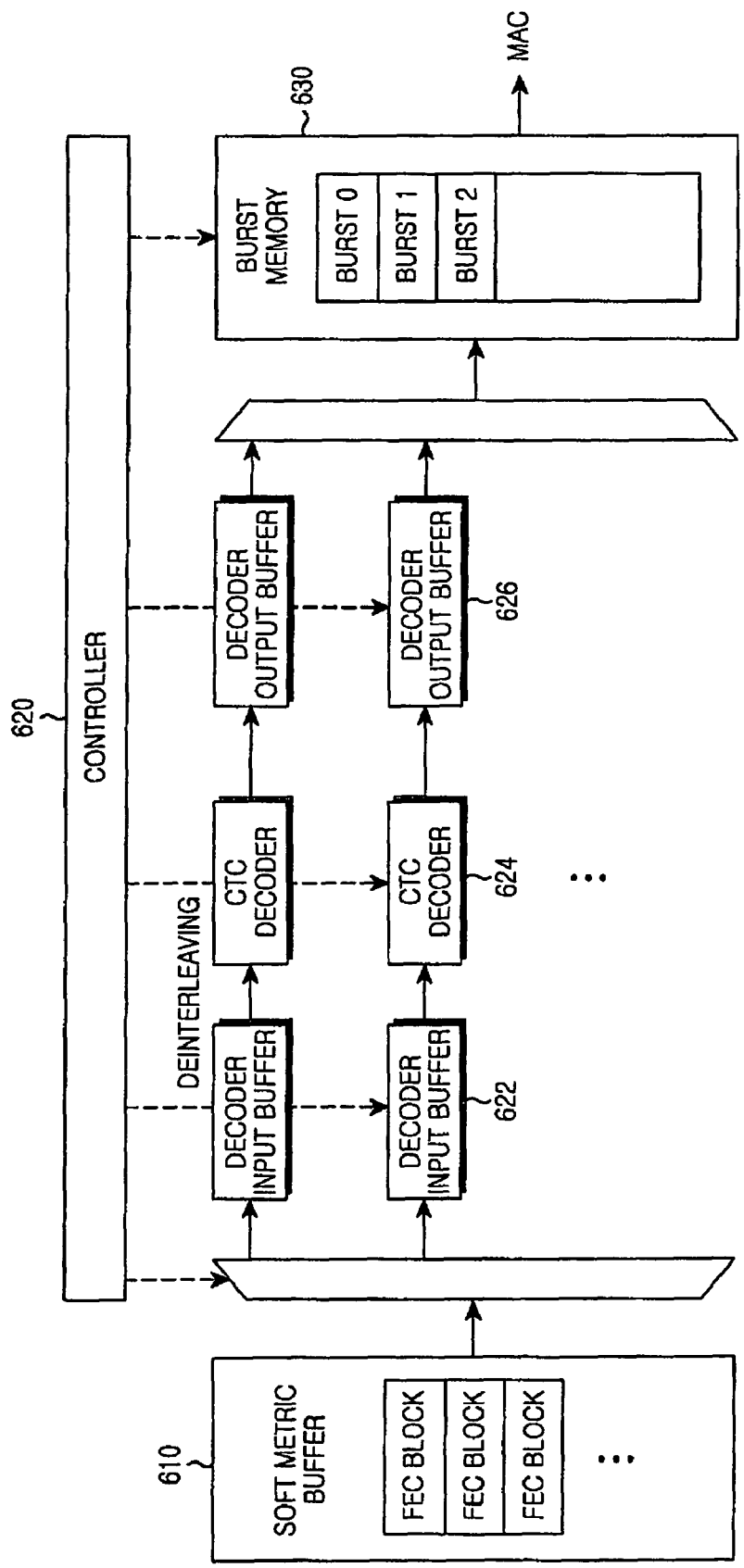
FIG. 6 is a block diagram of a decoder controlling apparatus in a receiver in the IEEE 802.16e communication system.
Figure 7:
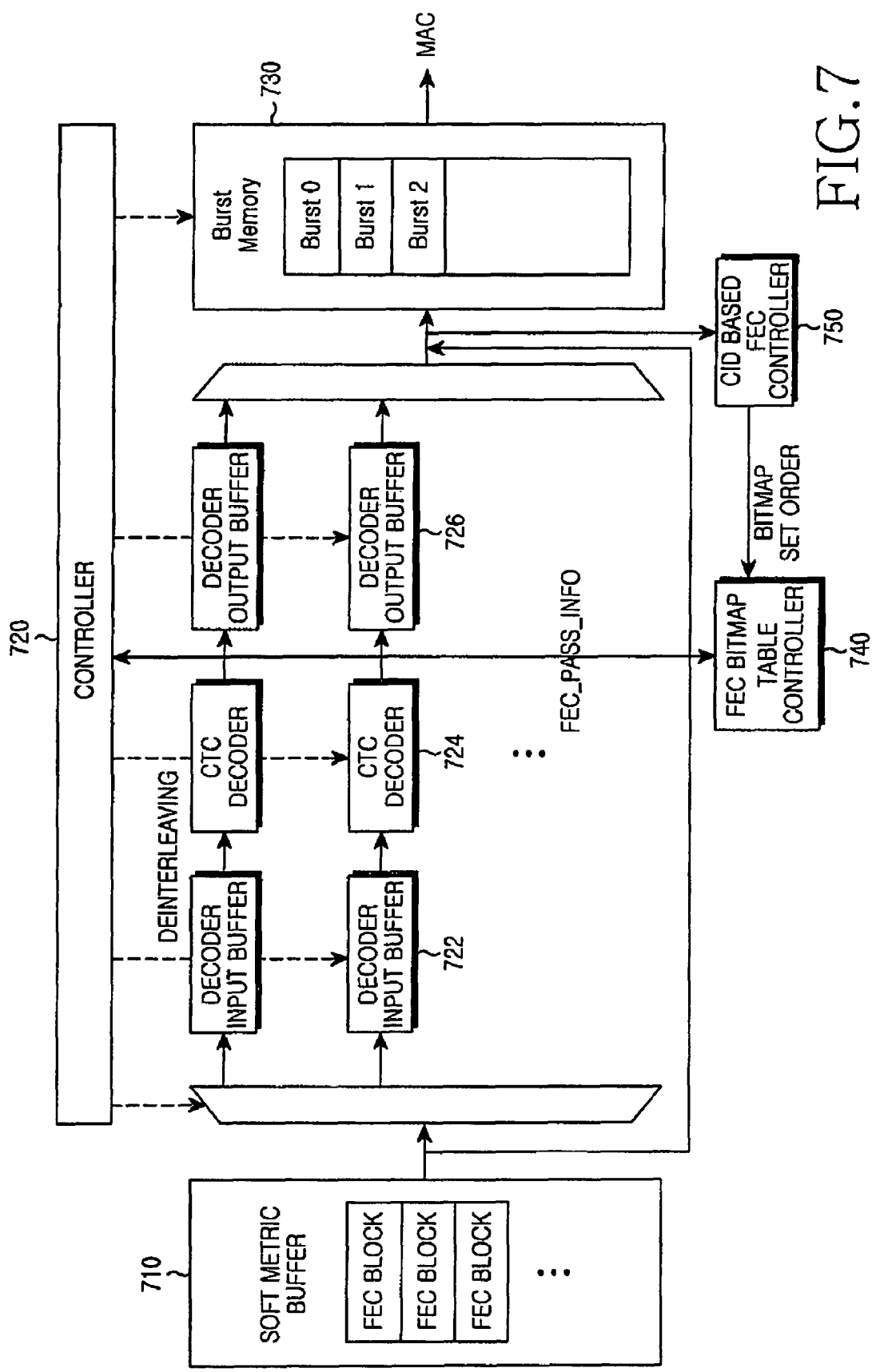
FIG. 7 is a block diagram of a decoder controlling apparatus in a receiver according to an exemplary embodiment of the present invention.

FIG. 7 is a block diagram of a decoder controlling structure in a receiver according to an exemplary embodiment of the present invention.

Referring to FIG. 7, the decoder controlling apparatus further includes a CIDCON 750 and an FEC bitmap table controller 740 in addition to the components of the conventional decoder controlling apparatus.

Data transferred from decoder output buffers 726 of CTC decoders 724 to a burst memory 730 are provided to the CIDCON 750, so that the CIDCON 750 analyzes MAC PDUs of the data and thus controls the receiver to avoid decoding of FEC blocks of MAC PDUs with CIDs different from the CID of the receiver.

The CIDCON 750 checks the decoded data, analyzes the headers of the MAC PDUs, and requests the FEC bitmap table controller 740 to set an FEC bitmap. Accordingly, the FEC bitmap table controller 740 sets the FEC bitmap indicating for each FEC block whether it should be just passed.

Before decoding an FEC block, a controller 720 checks the FEC bitmap table and skips unnecessary FEC blocks during decoding. The unnecessary FEC blocks are moved from a soft metric buffer 710 directly to the burst memory 730. The function of decoder input buffer 722 is same to that of decoder input buffer 622.

Figure 8:
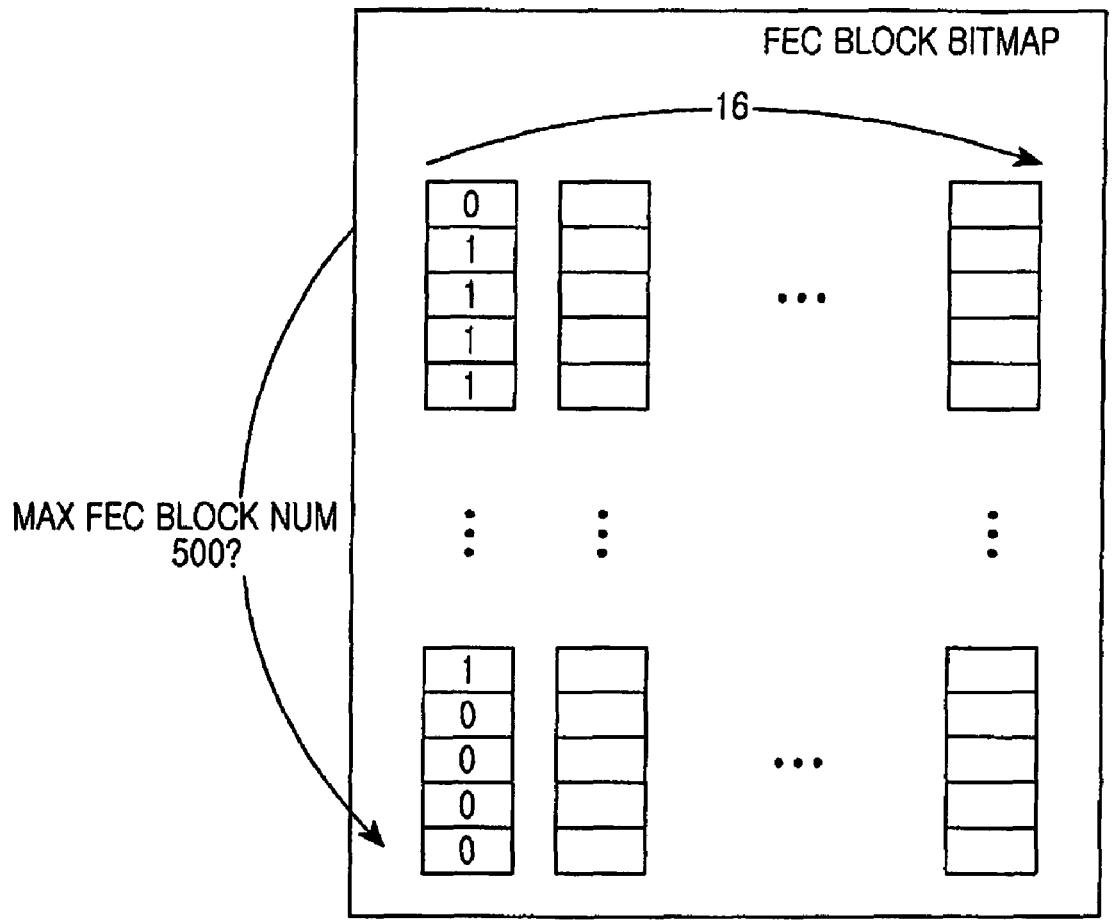
FIG. 8 illustrates an FEC bitmap according to an exemplary embodiment of the present invention.

FIG. 8 illustrates the FEC bitmap according to an exemplary embodiment of the present invention.

Referring to FIG. 8, the FEC bitmap includes up to 16 bursts, each burst having up to 500 FEC blocks.

Figure 9:
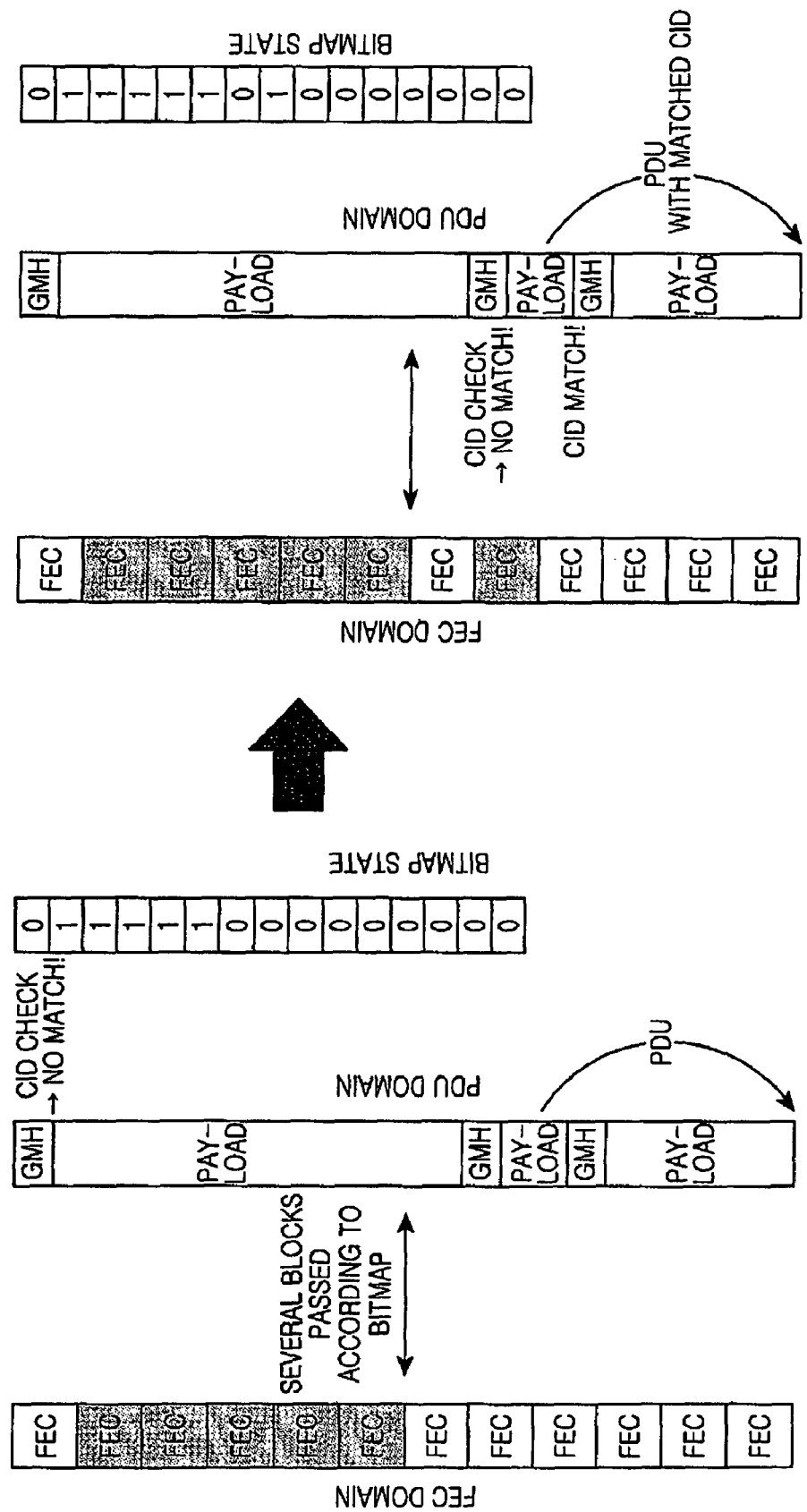
FIG. 9 illustrates a CID-based FEC block control operation according to an exemplary embodiment of the present invention.

FIG. 9 illustrates a CID-based FEC block control operation according to an exemplary embodiment of the present invention.

Referring to FIG. 9, it is assumed that a burst includes three MAC PDUs and an MS needs only the last PDU.

The controller 720 decodes a first FEC block. The CIDCON analyzes the decoded data of the first FEC block. A CID set in the GMH of a first MAC PDU does not match to the MS. The CIDCON can determine the length of the payload of the first MAC PDU by analyzing the GMH.

With knowledge of the length of the first MAC PDU and an FEC block size for the first MAC PDU, the controller 720 can determine how many successive FEC blocks can be passed. In the illustrated case of FIG. 9, five FEC blocks can be passed and bits corresponding to the five FEC blocks are set to 1s in a bitmap.

The GMH of the second MAC PDU is decoded. Although the first MAC PDU is not for the MS and the bitmap has been set so as to skip the five successive FEC blocks, the effect of the bitmap setting is exercised, starting from the third FEC block because decoding of the second FEC block has already started due to a CID-based control delay.

In the same manner, the bitmap is set for the second MAC PDU. Since the second MAC PDU is too small in size, although a bit corresponding to one FEC block of the second MAC PDU is set to 1 in the bitmap, the FEC block is not actually passed.

The MS is supposed to decode the last PDU and hence there is no need for setting the bitmap. In real implementation, the CTC decoders are set so as to decode all FEC blocks corresponding to the last two PDUs. In the above case, the CTC decoders save power by 30% or more due to the passing of the four FEC blocks.

The CID-based FEC control is more effective for a larger PDU size with no CID match to the MS. The MS can decode even a burst beyond its decoding capacity if a MAC PDU allocated to the MS is sufficiently small. Therefore, the operation freedom of the system increases.

Figure 10:
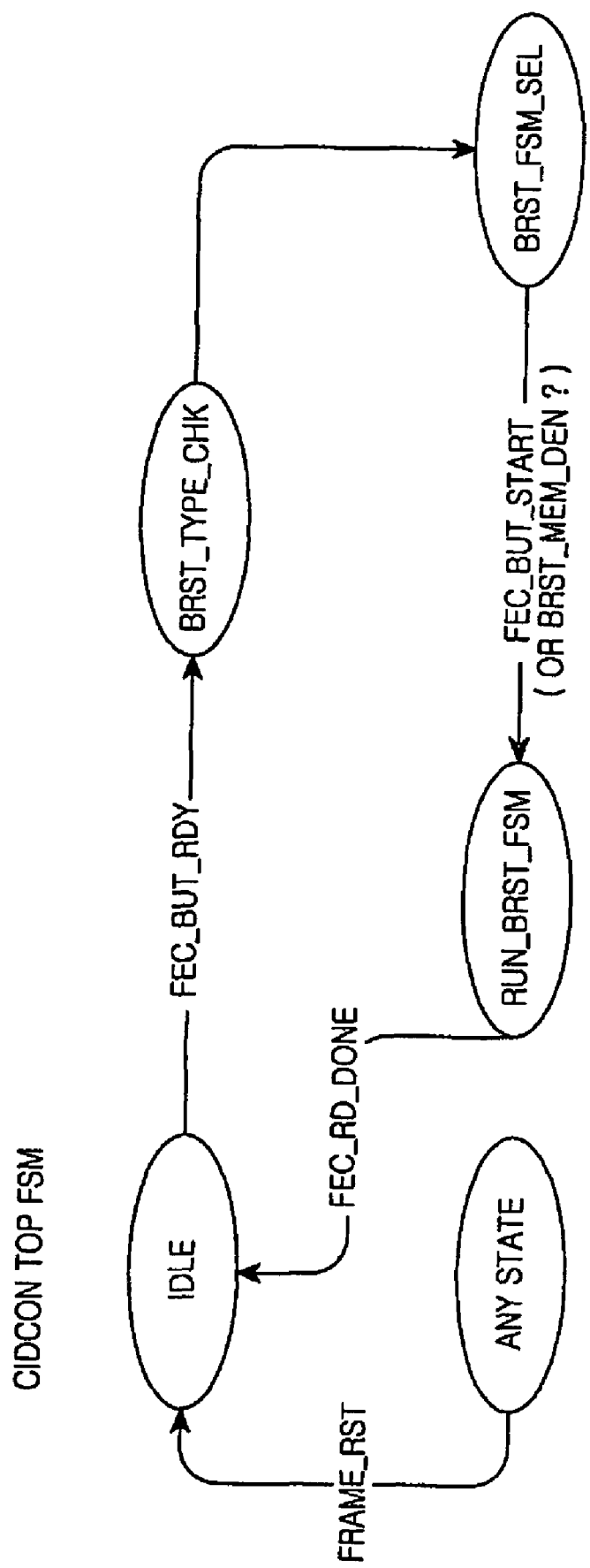
FIG. 10 illustrates a top Finite State Machine (FSM) in a CID-based FEC Controller (CIDCON) according to an exemplary embodiment of the present invention.

FIG. 10 illustrates a top FSM in the CIDCON according to an exemplary embodiment of the present invention.

Referring to FIG. 10, the CIDCON controls operations of the top FSM and a burst FSM. The top FSM operates each time data are received from the decoder output buffers on an FEC block basis and executes a burst FSM corresponding to the burst.

When the CIDCON is ready to store an FEC block in the burst memory in idle state (fec_buf_rdy), it transitions to a burst type check state (Brst_Type_Chk). When it receives a burst ID, the CIDCON transitions to a burst FSM selection state (Brst_FSM).

If the burst FSM is completely processed, that is, the FEC block is completely stored in the burst memory (fec_rd_done), the CIDCON returns to the idle state.

Figure 11:
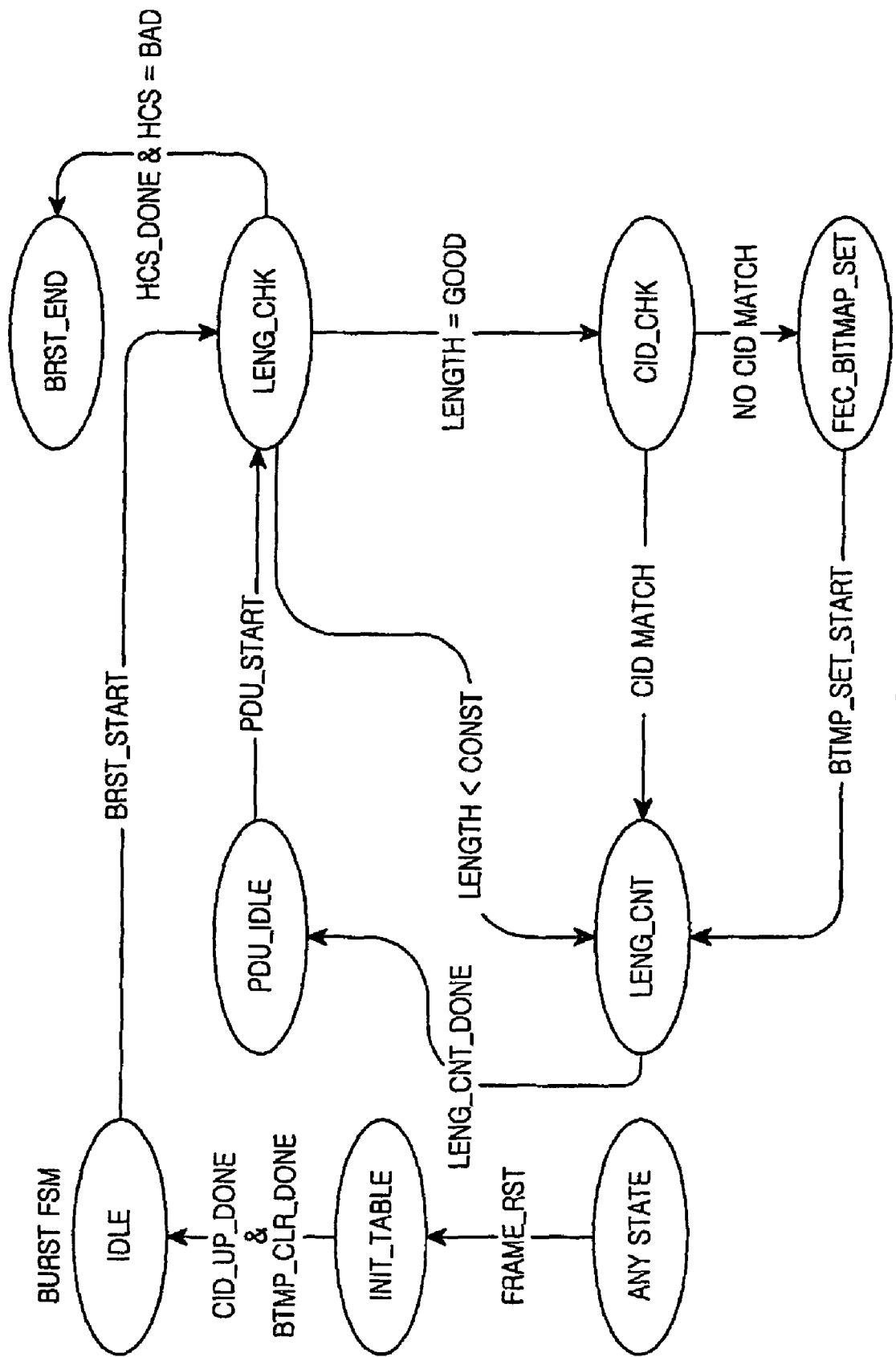
FIG. 11 illustrates a burst FSM in the CIDCON according to an exemplary embodiment of the present invention.

FIG. 11 illustrates a burst FSM in the CIDCON according to an exemplary embodiment of the present invention.

Referring to FIG. 11, the number of burst FSMs is determined according to the maximum number of bursts that can be allocated in a frame.

When receiving burst data in idle state (brst_start), the CIDCON transitions a PDU length check state (Leng_Chk). If the length measurement indicates that the PDU should not be passed without decoding (Length<Const), the CIDCON counts the burst data for the PDU length (Leng_Cnt). If the count is completed, the CIDCON transitions a PDU idle state. In this case, the PDU is normally decoded.

If the length measurement indicates that the PDU can be passed without decoding (Length=Const), the CIDCON transitions to a state in which it checks the CID of the PDU and compares the CID with the CID of the MS (CID_Chk).

If the CIDs are identical (CID match), the CIDCON transitions to a length count state (Leng_Cnt) where it counts the burst data for the PDU length. Then, if the count is completed (leng_cnt_done), the CIDCON transitions to the PDU idle state. In this case, the PDU is for the MS and thus is normally decoded.

If the CIDs are different (no CID match), the CIDCON transitions to a bitmap setting state (FEC_bitmap_Set) and then orders the FEC bitmap table controller to start bitmap setting (btmp_set_start). Then, the CIDCON transitions to the length count state (Leng_Cnt). If the count is completed (leng_cnt_done), the CIDCON transitions to the PDU idle state. In this case, since the PDU is not for the MS, the PDU is simply passed without decoding.

Table 2 below lists GEC block sizes for Modulation and Coding Schemes (MCSs) in the IEEE 802.16e communication system.

TABLE 2

| FEC | MCS | fec_bytes |
|---|---|---|
| CTC | QPSK, ½ | 60 |
|  | QPSK, ¾ | 54 |
|  | 16QAM, ½ | 60 |
|  | 16QAM, ¾ | 54 |
|  | 64QAM, ½ | 54 |
|  | 64QAM, ⅔ | 48 |
|  | 64QAM, ¾ | 54 |
|  | 64QAM, ⅚ | 60 |

The FEC block size is the size of data before encoding. Table 2 can be used for calculating the number of FEC blocks to be passed using a PDU length.

Figure 12:
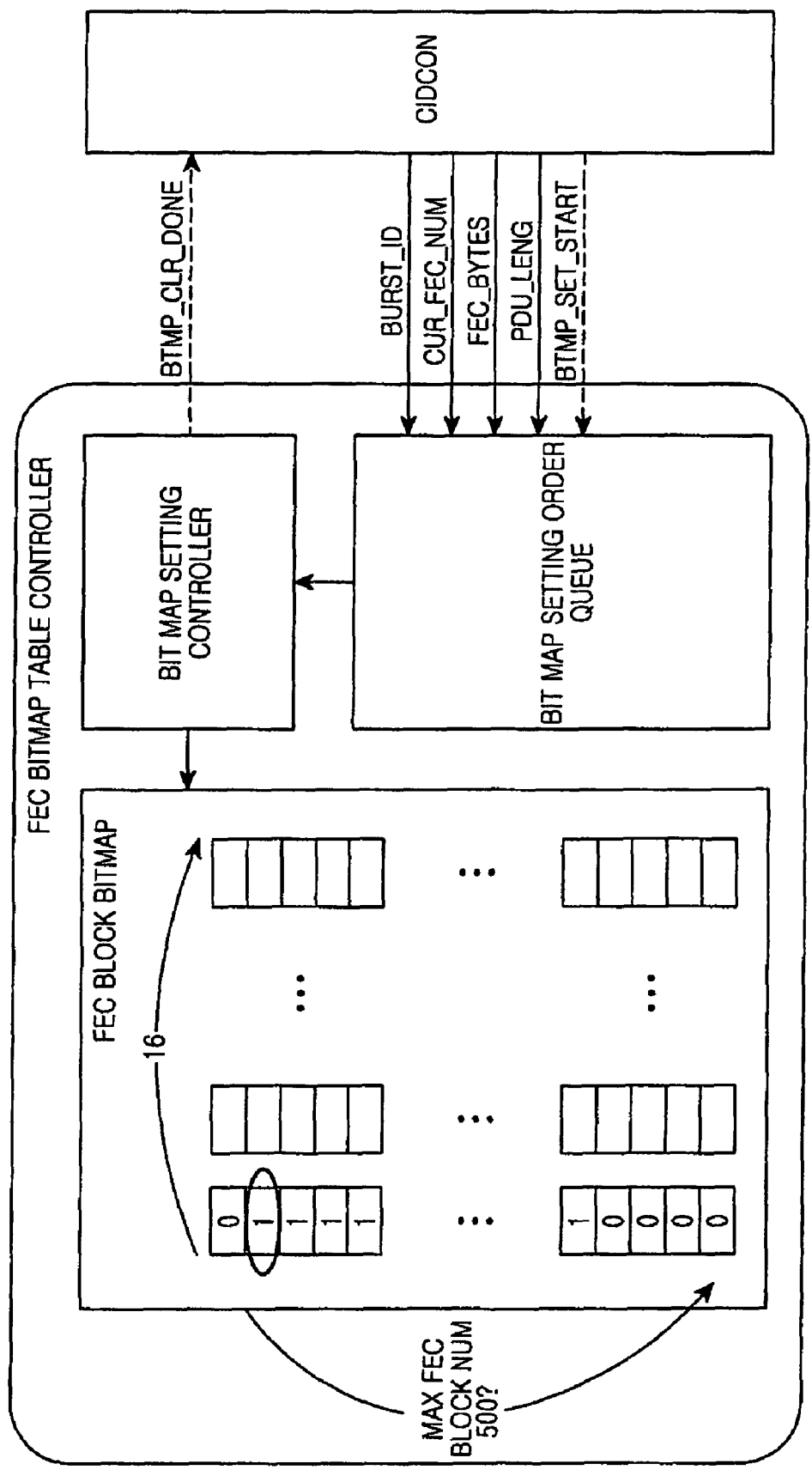
FIG. 12 illustrates a control operation of an FEC bitmap table controller according to an exemplary embodiment of the present invention.

FIG. 12 illustrates a control operation of the FEC bitmap table controller according to an exemplary embodiment of the present invention.

Referring to FIG. 12, the CIDCON provides a burst ID (burst_id), a current FEC block number in the burst (cur_fec_num), an FEC block size (fec_bytes), and a PDU length (pdu_length) to be set and orders bitmap setting to the FEC bitmap table controller. Since the FEC bitmap table controller can receive a new order before the bitmap setting depending on system implementation, it uses a bitmap setting order queue.

Upon receipt of the bitmap set order, a bitmap setting controller sequentially sets bits representing as many FEC blocks as the PDU length (pdu_length) to 1s, starting from the current FEC block number (cur_fec_num).

The bitmap setting is completed, the bitmap setting order queue checks the next queued order. If there is a queued order, bitmap setting starts according to the order.

If there is no queued order, the bitmap setting controller transmits a complete signal (bitmap_clr_done) to the CIDCON.

Figure 13:
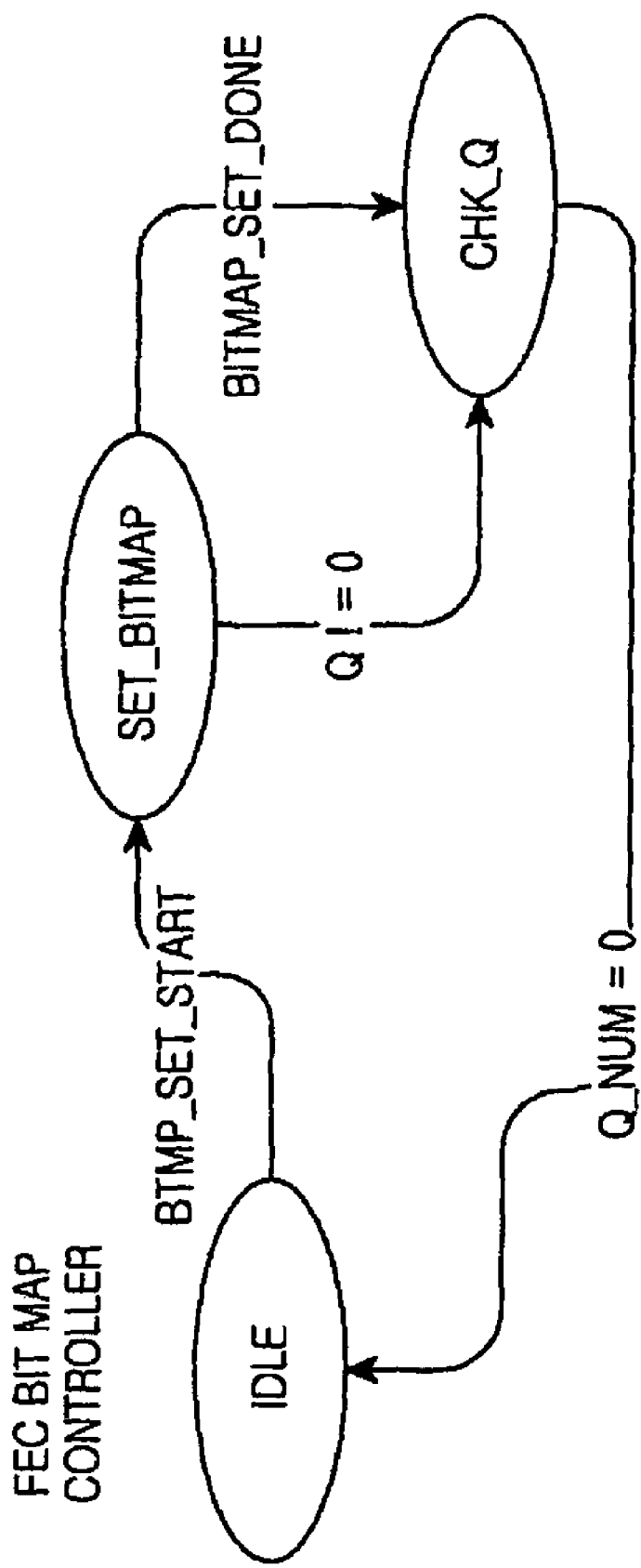
FIG. 13 illustrates an FSM in a bitmap setting controller of the FEC bitmap controller according to an exemplary embodiment of the present invention.

FIG. 13 illustrates an FSM in the bitmap setting controller of the FEC bitmap controller according to an exemplary embodiment of the present invention.

Referring to FIG. 13, upon receipt of a bitmap start order (btmp_set start) in idle state, the bitmap setting controller transitions to a bitmap setting state (Set_Bitmap) where it sequentially sets bits representing as many FEC blocks as the PDU length (pdu_length) to 1s, starting from the current FEC block number (cur_fec_num).

When the bitmap setting is completed (bitmap_set_done), the bitmap setting controller transitions to an order check start (Chk_Q) in which the bitmap setting order queue checks the existence of a queued order. In the presence of a queued order (Q!=0), the bitmap setting controller transitions to the bitmap setting state (Set_Bitmap) according to the order.

If there is no queued order (Q_num=0), the bitmap setting controller outputs a complete signal (btmap_clr_done) to the CIDCON and transitions to the idle state.

Figure 14:
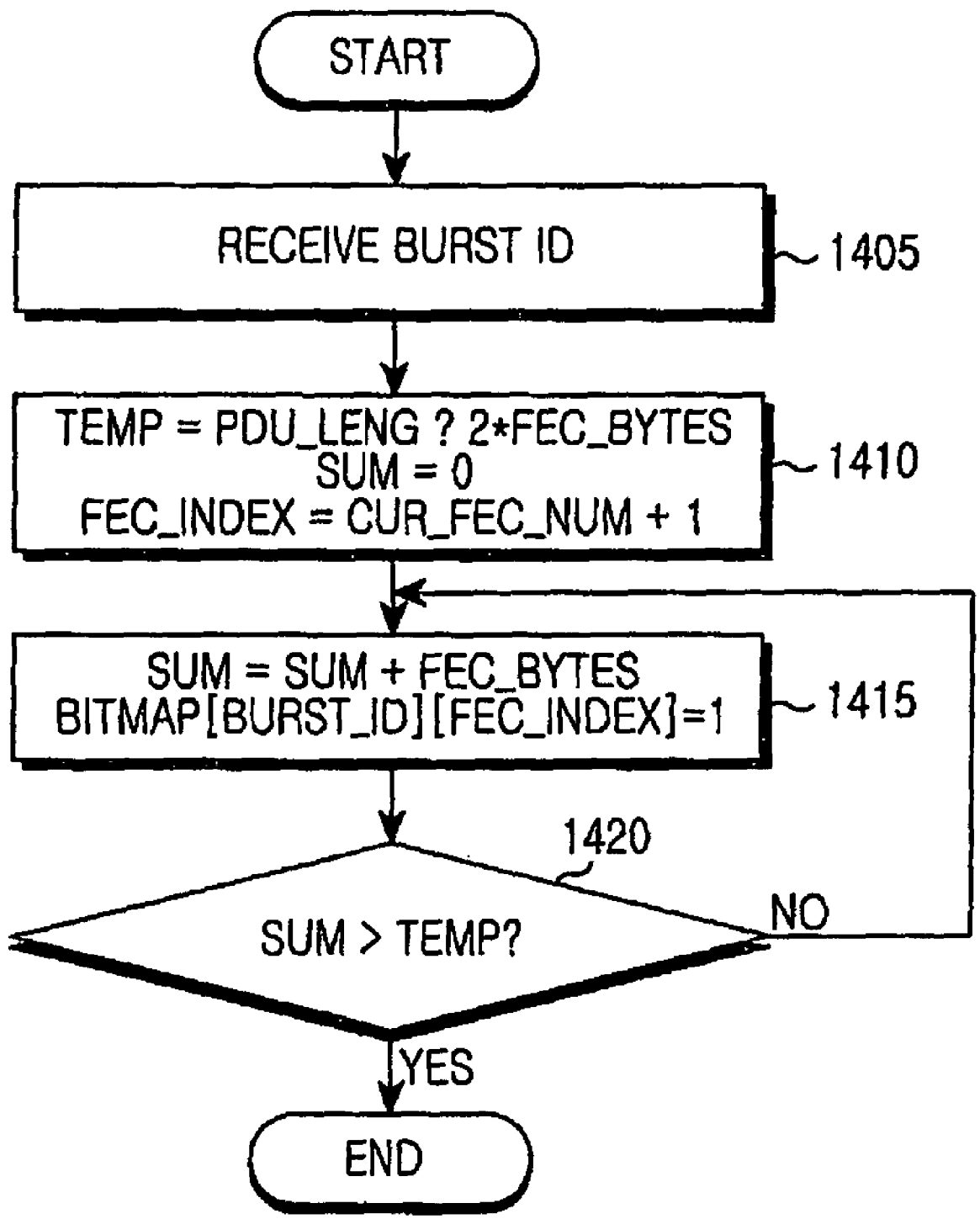
FIG. 14 is a flowchart illustrating an operation of the bitmap setting controller according to an exemplary embodiment of the present invention.

FIG. 14 is a flowchart illustrating an operation of the bitmap setting controller according to an exemplary embodiment of the present invention.

Referring to FIG. 14, the bitmap setting controller receives the ID of burst for which the bitmap is to be set in step 1405 and sets a threshold (temp) by which to determine whether bitmap setting is completed to a value resulting from subtracting 2xfec_bytes from a PDU length (pdu_length) received from the CIDCON in step 1410.

Step 1410 is performed in order to prevent skipping of an FEC block with the GMH of the next PDU, that is, in order to pass the other FEC blocks except the last two FEC blocks for the PDU length during decoding.

To be more specific, the PDU length is preset and the end of the PDU may not align with the end of an FEC block. Thus, the PDU ends in the middle of an FEC or at any other position of an FEC. Therefore, the last two FEC blocks of the PDU are normally decoded to prevent skipping of the GMH of the next PDU and thus to identify the next PDU and detect its GMH.

As a consequence, the threshold (temp) is two FEC blocks shorter than the PDU length.

In step 1410, the sum of lengths for the on-going PDU is set to an initial value 0 and an FEC block index (fec_index) is set to cur_fec_num+1. Initially, cur_fec_num is 0.

In step 1415, the sum is increased by fec_bytes and a bit representing fec_index under the burst ID is set to 1 in the bitmap. That is, the bit representing the on-going FEC block of the current PDU is set to 1 in the bitmap.

If the sum is equal to or less than temp in step 1420, the procedure returns to step 1415. That is, if the bitmap setting is not completed for the other FEC blocks except for the last two FEC blocks, the bitmap setting continues.

If the sum is larger than temp in step 1420, that is, if the bitmap setting is completed for the other FEC blocks except for the last two FEC blocks, the algorithm of the present invention ends.

Figure 15A:
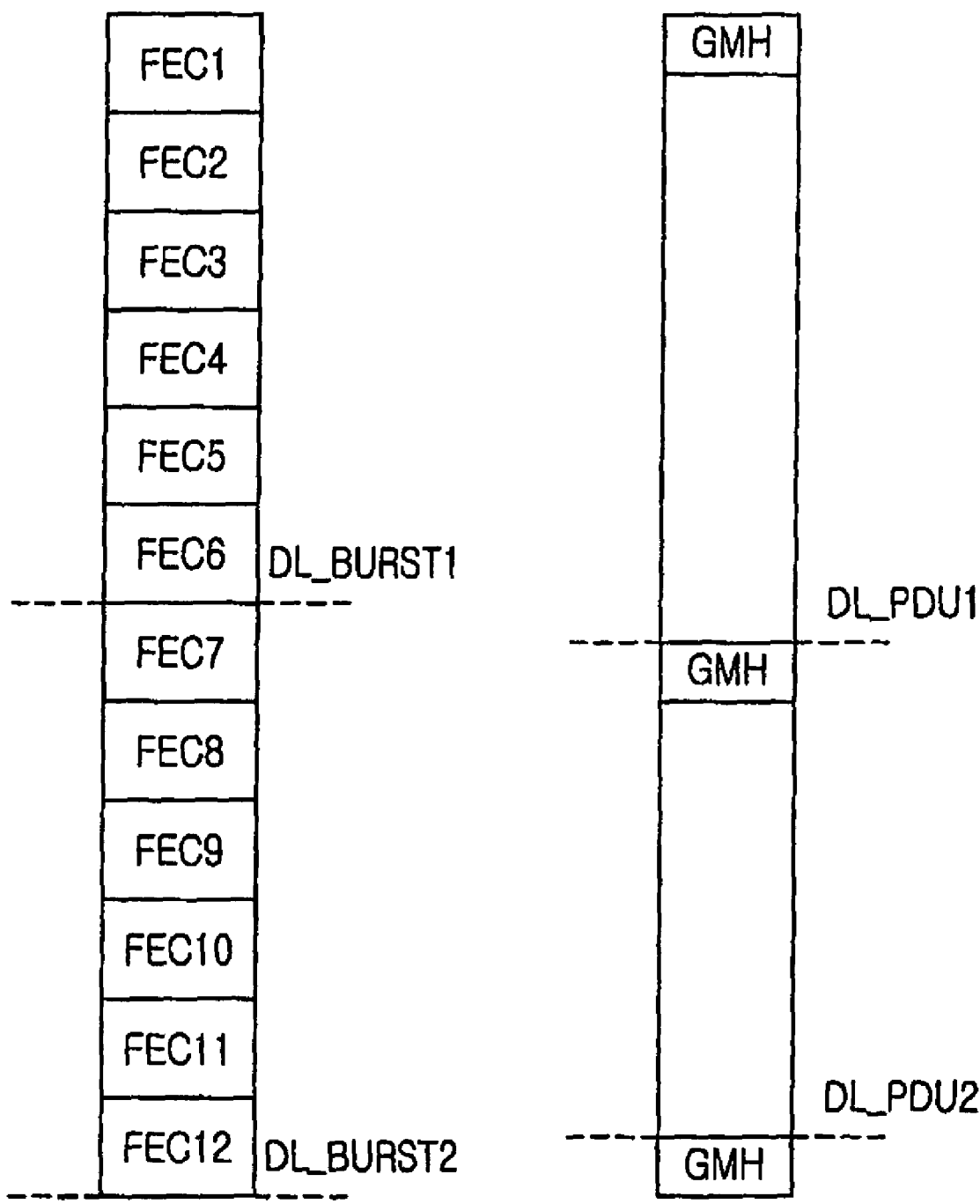
FIG. 15A illustrates the structure of a burst according to an exemplary embodiment of the present invention.

FIG. 15A illustrates the structure of a burst according to an exemplary embodiment of the present invention.

Referring to FIG. 15A, bursts and PDUs after DL-MAP decoding are shown. While it is shown that one burst includes one PDU, one burst may include a plurality of PDUs in the IEEE 802.16e communication system.

Figure 15B:
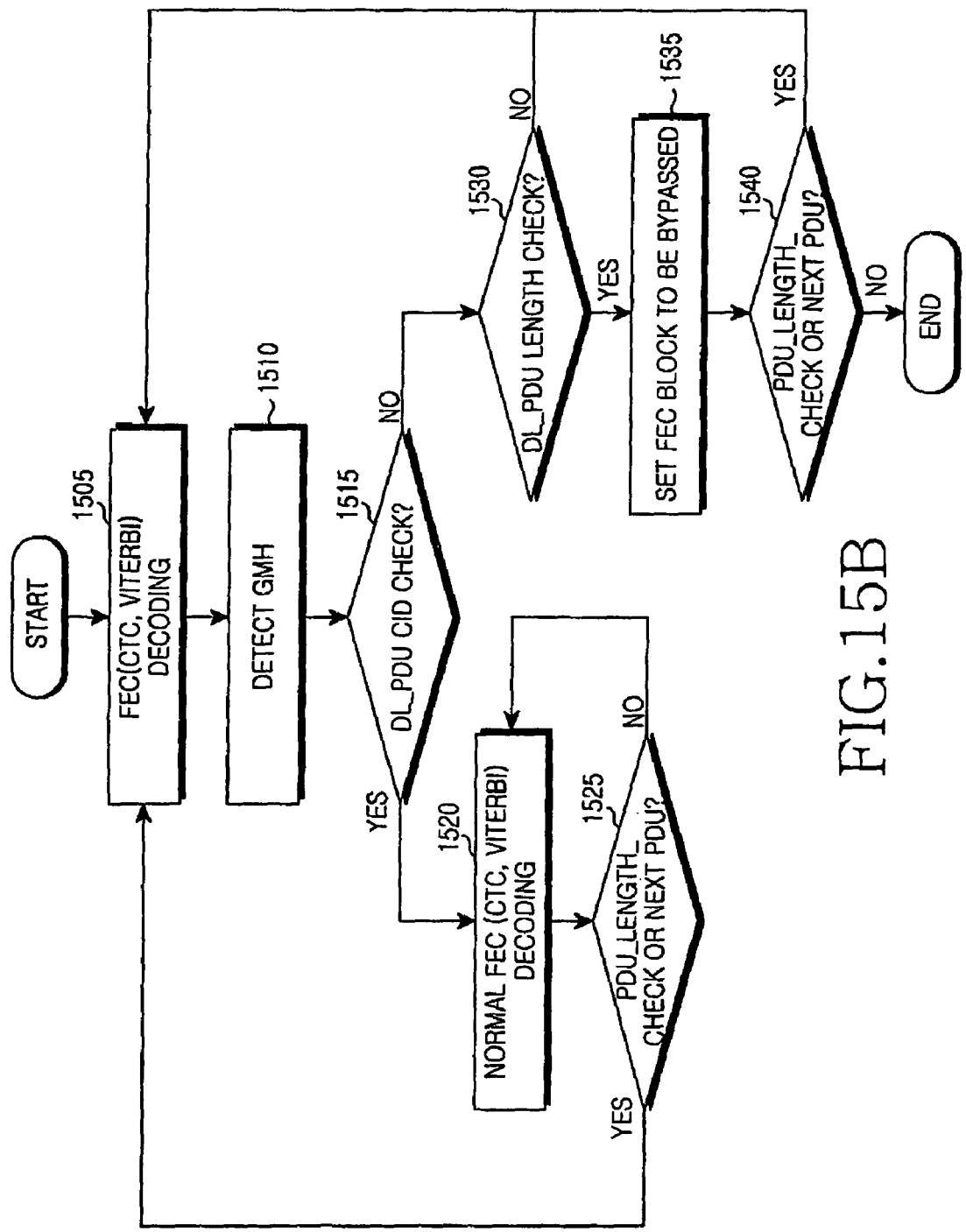
FIG. 15B is a flowchart illustrating a decoding operation according to an exemplary embodiment of the present invention.

FIG. 15B is a flowchart illustrating a decoding operation according to an exemplary embodiment of the present invention.

Referring to FIG. 15B, an FCH and a DL-MAP have been decoded and thus bursts are received. In the illustrated case of FIG. 15B, a basic CID is not found after the DL-MAP decoding and a decoded FEC block has the structure illustrated in FIG. 15A.

FEC1 is normally decoded in step 1505 and the GMH of DL_PDU1 is detected using the decoded data of FEC1 in step 1510. The GMH of DL_PDU1 is 48 bits (6 bytes) long, including Transparent CID and PDU_Length for DL_PDU1.

In step 1515, a CID set in the GMH of DL_PDU1 is compared with the CID of the MS.

If the CIDs are matched, the MS decodes an FEC in step 1520 and determines whether the next PDU is reached in step 1525. If the next PDU is reached, the MS normally decodes the first FEC block of the next PDU in step 1505.

Table 2 illustrates the amount of information achieved from the decoding of one FEC block. When an FEC block with QPSK and Puncturing ½ is decoded, 60-byte data is achieved according to Table 2. Therefore, comparison between the data length of an FEC block and a PDU length reveals the decoded position of a current PDU.

That is, if a PDU is for the MS, the MS locates the next PDU by calculating an FEC block size during normal decoding. As to an FEC block decoding order, part of the GMH of DL_PDU2 is detected by decoding FEC7 and the remaining part of the GMH is partially detected by decoding FEC8. A CID and a PDU length for DL_PDU2 are found in the detected GMH.

If the PDU is not for the MS, the MS determines whether the PDU is long enough to be bypassed in step 1530. If the PDU is too short to be bypassed, the MS normally decodes the PDU until receiving the next PDU in step 1505

If the PDU is long enough to be bypassed in step 1530, the bitmap is set for FEC blocks to be bypassed in step 1535.

If DL_PDU1 is not for the MS, the bitmap is set such that FEC2, FEC3, FEC4 and FEC5 are not decoded normally. The last two FEC blocks of DL_PDU1 are normally decoded.

When the MS receives the next PDU in step 1540, it normally decodes the first FEC block of the next PDU in step 1505.

Then, the algorithm of an exemplary embodiment of the present invention ends.

As is apparent from the above description, the decoding apparatus and method of the present invention decodes only necessary FEC blocks, thus saving power consumption. As a PDU requiring no decoding is longer, more power is saved. A receiver can decode even a burst beyond its decoding capacity as far as the burst includes small-size data requiring decoding, thereby increasing the operation freedom of a network system.

While the invention has been shown and described with reference to certain embodiments of the present invention thereof, it will be understood by those skilled in the art that various changes in form and details may be made therein without departing from the spirit and scope of the present invention as defined by the appended claims and their equivalents.

What is claimed is:

1. A receiver in a Broadband Wireless Access (BWA) communication system, the receiver comprising:
   an Identifier (ID)-based decoder controller for detecting an ID from a data block by partially decoding the data block, and if the ID indicates that the data block is not for the receiver and if data length of the data block is long enough to be bypassed, outputting a control signal commanding non-decoding for the data block;
   a bitmap table controller for indicating the data block as a non-decoding data block in a bitmap table according to the control signal; and
   a decoder for distinguishing data blocks to be decoded from non-decoding data blocks based on the bitmap table, decoding the data blocks to be decoded and outputting the decoded data blocks, and outputting the non-decoding data blocks without decoding;
   wherein the ID is a Connection ID (CID); and
   wherein the data blocks are Forward Error Correction (FEC) blocks.

2. The receiver of claim 1, further comprising a memory for storing the decoded data blocks and the non-decoding data blocks received from the decoder and providing the decoded data blocks and the non-decoding data blocks to an upper layer.

3. The receiver of claim 1, wherein the ID-based decoder controller checks the data length of a data block and outputs a control signal commanding non-decoding for the data block, if the data block has a length equal to or larger than a predetermined length.

4. The receiver of claim 1, wherein the bitmap table controller indicates two last data blocks as data blocks to be decoded in the bitmap table.

5. The receiver of claim 1, wherein the bitmap table controller indicates a data block as a non-decoding data block by receiving information about the size and ID of the non-decoding data block from the ID-based decoder controller.

6. A reception method in a Broadband Wireless Access (BWA) communication system, the method comprising the steps of:
   partially decoding a data block;
   detecting an ID from the partially decoded data block;
   outputting a control signal commanding non-decoding for the data block, if the ID indicates that the data block is not for a receiver and if data length of the data block is long enough to be bypassed;
   indicating the data block as a non-decoding data block in a bitmap table according to the control signal; and
   distinguishing data blocks to be decoded from non-decoding data blocks based on the bitmap table, decoding the data blocks to be decoded and outputting the decoded data blocks, and outputting the non-decoding data blocks without decoding;
   wherein the ID is a Connection ID (CID); and
   wherein the data blocks are Forward Error Correction (FEC) blocks.

7. The reception method of claim 6, further comprising the step of storing the decoded data blocks and the non-decoding data blocks and providing the decoded data blocks and the non-decoding data blocks to an upper layer.

8. The reception method of claim 6, wherein the control signal outputting comprises outputting the control signal commanding non-decoding for the data block, only if the data block is a non-decoding data block and has a length equal to or larger than a predetermined length.

9. The reception method of claim 6, wherein the indicating comprises indicating two last data blocks as data blocks to be decoded in the bitmap table.

10. The reception method of claim 6, wherein the indicating comprises indicating the data block as a non-decoding data block by receiving information about the size and ID of the data block.

* * * * *